United States Patent
Csatari et al.

(10) Patent No.: US 11,294,698 B2
(45) Date of Patent: Apr. 5, 2022

(54) WAITING A HOST DETERMINED SPECIFIC AMOUNT OF TIME BEFORE PERFORMING VIRTUAL NETWORK FUNCTION MIGRATION

(71) Applicant: NOKIA SOLUTIONS AND NETWORKS OY, Espoo (FI)

(72) Inventors: Gergely Csatari, Budapest (HU); Timea Laszlo, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 404 days.

(21) Appl. No.: 15/124,526

(22) PCT Filed: Dec. 23, 2014

(86) PCT No.: PCT/EP2014/079106
§ 371 (c)(1),
(2) Date: Sep. 8, 2016

(87) PCT Pub. No.: WO2015/135611
PCT Pub. Date: Sep. 17, 2015

(65) Prior Publication Data
US 2017/0017512 A1 Jan. 19, 2017

Related U.S. Application Data

(60) Provisional application No. 61/950,474, filed on Mar. 10, 2014.

(51) Int. Cl.
*G06F 9/455* (2018.01)
*G06F 9/48* (2006.01)
(52) U.S. Cl.
CPC ........ *G06F 9/45558* (2013.01); *G06F 9/4856* (2013.01); *G06F 2009/4557* (2013.01); *G06F 2009/45595* (2013.01)

(58) Field of Classification Search
CPC ............... G06F 9/45558; G06F 9/4856; G06F 2009/45595; G06F 2009/4557
See application file for complete search history.

(56) References Cited

U.S. PATENT DOCUMENTS

| | | | |
|---|---|---|---|
| 7,673,113 B2 * | 3/2010 | Sugumar | G06F 9/45558 711/170 |
| 8,413,147 B2 * | 4/2013 | Shen | G06F 9/45558 718/1 |

(Continued)

FOREIGN PATENT DOCUMENTS

| CN | 101430649 A | 5/2009 |
|---|---|---|
| CN | 102981888 A | 3/2013 |

OTHER PUBLICATIONS

International Search Report & Written Opinion dated Mar. 12, 2015 corresponding to International Patent Application No. PCT/EP2014/079106.

(Continued)

*Primary Examiner* — Michael W Ayers
(74) *Attorney, Agent, or Firm* — Squire Patton Boggs (US) LLP

(57) ABSTRACT

Notification about Virtual Machine Live Migration to VNF Manager Various network systems may benefit from receiving notification about virtual live migration. For example, clustered telecommunication applications may benefit from live migration notifications of their virtual machines (VM). Such benefits may be achieved through technology known as Network Function Virtualization (NFV). According to certain embodiments, a method includes deciding that a virtual network function component should be moved from a first host to a second host. The method can also include notifying a virtual network function manager VNF about moving the virtual network function component. The method can further include moving the virtual network (Continued)

function component from the first host to the second host only when approval is received from the virtual network function manager. The method can also include notifying the virtual network function manager that the movement of the virtual network function component has been completed.

14 Claims, 11 Drawing Sheets

(56) References Cited

U.S. PATENT DOCUMENTS

| | | | | |
|---|---|---|---|---|
| 8,484,653 B2* | 7/2013 | Tsirkin | ................ | G06F 9/45558 718/104 |
| 9,513,945 B2* | 12/2016 | Shimogawa | ........ | G06F 9/45558 |
| 9,703,598 B2* | 7/2017 | Vincent | ...................... | G06F 8/10 |
| 2008/0163239 A1* | 7/2008 | Sugumar | ............... | G06F 9/5088 718/105 |
| 2009/0288084 A1 | 11/2009 | Astete et al. | | |
| 2011/0107331 A1 | 5/2011 | Evans et al. | | |
| 2011/0138384 A1* | 6/2011 | Bozek | ................. | H04L 43/0882 718/1 |
| 2013/0054813 A1* | 2/2013 | Bercovici | ............. | G06F 9/4856 709/226 |
| 2013/0305242 A1* | 11/2013 | Wang | .................. | G06F 9/45558 718/1 |
| 2014/0201374 A1* | 7/2014 | Ashwood-Smith | ..... | H04L 49/70 709/226 |
| 2018/0046490 A1* | 2/2018 | Onoue | .................. | G06F 9/5088 |

OTHER PUBLICATIONS

C. Clark et al, "Live migration of virtual machines," Proceedings of the Symposium on Networked Systems Design and Implementation, Usenix Association, Jan. 1, 2015, pp. 273-286, XP002443245.
"Network Functions Virtualisation (NFV); Architectural Framework," Group Specification, 3GPP Draft; ETSI GS NFV 002 V1.1.1 (Oct. 2013), Nov. 4, 2013, XP050767875, pp. 1-21.
Chinese Office Action issued in corresponding Chinese Patent Application No. 201480078754.7 dated Mar. 26, 2019.
Chinese Office Action issued in corresponding Chinese Patent Application No. 201480078754.7 dated Jan. 7, 2020.

* cited by examiner

RELATED ART

WAITING A HOST DETERMINED SPECIFIC AMOUNT OF TIME BEFORE PERFORMING VIRTUAL NETWORK FUNCTION MIGRATION

CROSS-REFERENCE TO RELATED APPLICATIONS

This application is related to and claims the benefit and priority of U.S. Provisional Patent Application No. 61/950,474, filed Mar. 10, 2014, which is hereby incorporated by reference in its entirety.

BACKGROUND

Field

Various network systems may benefit from receiving notification about virtual machine live migration. For example, clustered telecommunication applications may benefit from live migration notifications of their virtual machines (VM). Such benefits may be achieved through technology known as Network Function Virtualization (NFV).

Description of the Related Art

Generally, NFV relates to an alternative design approach for building complex information technology applications, such as, for example, in the telecommunications and service provider industries, that virtualize entire classes of function into building blocks that may be connected, or chained, together to create services. Traditionally, network services are generally defined by statically combining network functions in a way that can be expressed using a network function (NF) Forwarding Graph, or NF Set construct. However, NF virtualization enables additional dynamic methods to construct and manage the NF graphs or sets, and their relationship regarding their associated data, control, management, dependencies and other attributes.

NFV introduces a number of differences in the way network service provisioning is realized in comparison with what is generally practiced today. For example, such technology enables the software to progress separately from the hardware, and vice versa since the network element is no longer a collection of integrated hardware and software entities. That is, there is a detachment of software from hardware, which allows the hardware and the software to perform different functions at various times. Further, the decoupling of the functionality of the NF into software components provides greater flexibility to scale the actual virtual network function (VNF) performance in a more dynamic way.

An NFV may be characterized by an NFV architectural framework, which identifies functional blocks and the main reference points between such blocks. Such an architectural framework is described in "Network Functions Virtualisation (NFV); Architectural Framework", ETSI GS NFV 002 v1.1.1 (2013-10), the contents of which are incorporated herein by reference in its entirety.

FIG. 1 illustrates a conventional NFV architectural framework 100 with relevant components and interfaces highlighted. The architectural framework shown focuses on the functionalities necessary for virtualization and the consequent operation of an operator's network. The NFV architectural framework 100 may include one or more virtualized network functions (VNFs) 105, 106 and 107. The VNF is a virtualization of a network function in a legacy non-virtualized network. In particular, the VNFs 105, 106 and 107 may be characterized as network elements that consist of several VMs in a cluster. The VNFs 105, 106 and 107 can be composed of multiple internal components. For example, VNF 1 105 may be deployed over multiple VMs, where each VM hosts a single component of the VNF. However, in other cases, the whole VNF can be deployed in a single VM as well.

The NFV architectural framework 100 may also include one or more element management systems (EMS) 110, 111 and 112. The EMS may perform typical management functionality for one or more VNFs. The NFV architectural framework 100 may further include an NFV infrastructure of hardware resources 125, 130 and 135. The hardware resource may include computing hardware 125, storage hardware 130 and network hardware 135. Additionally, the NFV architectural framework 100 may also include an NFV infrastructure of corresponding virtual resources. The virtual resources may include virtual computing 145, virtual storage 150 and virtual network 155. As such, the NFV infrastructure 115 may be representative of the totality of all hardware and software components which build up the environment in which VNFs 105, 106 and 107 are deployed, managed and executed.

The NFV architectural framework 100 may further include a virtualization layer 160 that abstracts the hardware resources 125, 130 and 135, and decouples the VNF software from the underlying hardware, thus ensuring a hardware independent lifecycle for the VNFs. The virtualization layer 160 may have various responsibilities. For example, the virtualization layer 160 may be responsible for abstracting and logically partitioning physical resources, commonly as a hardware abstraction layer. The virtualization layer 160 may also enable the software that implements, for example, the VNF 1 105 to use the underlying virtualized infrastructure. Finally, the virtualization layer 160 may further provide virtualized resources to the VNF 1 105, so that the latter can be executed.

As shown in FIG. 1, the virtualization layer 160 may be positioned in the middle of the NFV architectural framework 100 to ensure that the VNFs 105, 106 and 107 are decoupled from hardware resources, thus, allowing the software to be deployed on different physical hardware resources. When virtualization is used in the network resource domain, network hardware may be abstracted by the virtualization layer 160 to realize virtualized network paths that provide connectivity between VMs of a VNF and/or between different VNF instances.

The NFV architectural framework 100 may also include an NFV Management and Orchestration 165 that may further include various functionalities that are used to control and manage the interaction of a VNF with an Orchestrator 170, a VNF Manager(s) 175 and a Virtualized Infrastructure Manager(s) (VIM) 180. The Orchestrator 170 may be in charge of the orchestration and management of the NFV infrastructure 115 and software resources, and realizing network services on the NFV infrastructure 115. The VNF Manager(s) 175 may be responsible for the deployment and lifecycle management (e.g., instantiation, update, query, scaling, and termination) of a VNF 1 105. Multiple VNF Managers 175 may be deployed; a VNF Manager 175 may be deployed for each VNF 105, 106 and 107, or a VNF Manager 175 may serve multiple VNFs 105, 106 and 107. The VIM 180 may be an entity that manages the different resources of the NFV infrastructure 115. The VIM 180 may include the functionalities that are used to control and manage the interaction of a VNF with computing, storage and network resources under its authority, as well as their virtualization. The VIM 180 may perform resource management, in charge of the: (1) inventory software (e.g., hypervisors), computing, storage and network resources dedicated to the NFV infrastructure 115; (2) allocation of virtualization enablers (e.g., VMs onto hypervisors compute resources, storage and relevant network connectivity); and (3) management of infrastructure resource and allocation, (e.g., increase resources to VMs, improve energy efficiency and resource reclamation). The VIM 180 may also perform operations for: (1) visibility into and management of the NFV infrastructure 115; (2) root cause analysis of performance issues from the NFV infrastructure perspective; (3) collection of infrastructure fault information; and (4) collection of information for capacity planning, monitoring and optimization.

The NFV architectural framework 100 may also include various reference points. One such reference point, VI-Ha, interfaces the virtualization layer 160 to hardware resources 125, 130 and 135 to create an execution environment for VNFs, and collects relevant hardware resource state information for managing the VNFs without being dependent on any hardware platform. Another reference point, Vn-Nf, represents the execution environment provided by the NFV infrastructure 115 to the VNFs 105, 106 and 107. The Vn-Nf does not assume any specific control protocol. It is in the scope of NFV in order to guarantee hardware independent lifecycle, performance and portability requirements of the VNF.

Also included is an Or-Vnfm reference point that may be used for resource related requests (e.g., authorization, validation, reservation and allocation by the VNF Manager(s) 175. The Or-Vnfm may be used for sending configuration information to the VNF Manager 175, so that the VNFs 105, 106 and 107 can be configured appropriately to function within the VNF Forwarding Graph in the network service. Also included may be a Vi-Vnfm, which may be used for resource allocation requests by the VNF Manager 175, and for virtualized hardware resource configuration and state information (e.g., events) exchange. An Nf-Vi reference point is also included. This reference point may be used for specific assignment of virtualized resources in response to resource allocation requests. It may also be used for forwarding virtualized resources state information, and used for hardware resource configuration and state information (e.g., events) exchange.

The NFV architectural framework 100 further includes an Os-Ma reference point that may be used for requests for network service lifecycle management. It may also be used for requests for VNF lifecycle management, and forwarding of NFV related state information. It may further be used for policy management exchanges, data analytics exchanges, forwarding of NFV related accounting and usage records and NFV infrastructure capacity and inventory information exchanges. As another reference point, the NFV architectural framework 100 may also include a Ve-Vnfm that may be used for requests for VNF lifecycle management, exchanging configuration information and exchanging state information necessary for network service lifecycle management. Further an Se-Ma reference point may be included and used for retrieving information regarding the VNF deployment template, VNF Forwarding Graph, service-related information and NFV infrastructure information models. The information provided may be used by NFV Management and Orchestration 165.

SUMMARY

According to certain embodiments, a method can include deciding that a virtual network function component should be moved from a first host to a second host. The method can also include notifying a virtual network function manager about moving the virtual network function component. The method can further include moving the virtual network function component from the first host to the second host only when approval is received from the virtual network function manager. The method can also include notifying the virtual network function manager that the movement of the virtual network function component has been completed.

In an embodiment, the method may also include waiting for a specific amount of time, as requested by the virtual network function manager, before moving the virtual network function component. Further, according to an embodiment, the notifying may be performed via a Vi-Vnfm interface.

In an embodiment, the method may further include determining a status of a property of the virtual network function component. Further, according to another embodiment, movement of the virtual network function component may be forbidden if the specific time is zero, and movement of the virtual network function component may be authorized if the specific time is greater than zero.

An apparatus, according to certain embodiments, can include at least one processor, and at least one memory including computer program code. The at least one memory and the computer program code can be configured to, with the at least one processor, cause the apparatus at least to decide that a virtual network function component should be moved from a first host to a second host, notify a virtual network function manager about moving the virtual network function component, move the virtual network function component from the first host to the second host only when approval is received from the virtual network function manager, and notify the virtual network function manager that the movement of the virtual network function component has been completed.

In an embodiment, the at least one memory and the computer program code may be configured to, with the at least one processor, cause the apparatus at least to wait for a specific amount of time, as requested by the virtual network function manager, before moving the virtual network function component. Further, according to another embodiment, the notifying is performed via a Vi-Vnfm interface.

In an embodiment, the at least one memory and the computer program code may also be configured to, with the at least one processor, cause the apparatus at least to determine a status of a property of the virtual network function component. Further, according to another embodiment, movement of the virtual network function component may be forbidden if the specific time is zero, and movement of the virtual network function component may be authorized if the specific time is greater than zero.

An apparatus, according to other embodiments, can include means for deciding that a virtual network function component should be moved from a first host to a second host. The apparatus can also include means for notifying a virtual network function manager about moving the virtual network function component. The apparatus can further include means for moving the virtual network function component from the first host to the second host only when approval is received from the virtual network function manager. The apparatus can also include means for notifying the virtual network function manager that the movement of the virtual network function component has been completed.

In an embodiment, the apparatus can further include means for waiting for a specific amount of time, as requested by the virtual network function manager, before moving the virtual network function component. Further, according to another embodiment, the notifying may be performed via a Vi-Vnfm interface.

In an embodiment, the apparatus can also include means for determining a status of a property of the virtual network function component. Further, according to another embodiment, movement of the virtual network function component may be forbidden if the specific time is zero, and movement of the virtual network function component may be authorized if the specific time is greater than zero.

According to other embodiments, a method can include receiving a first notification that a virtual network function component should be moved from a first host to a second host. The method can also include notifying a virtual network function operation and management component that the virtual network function component should be moved. The method can further include reconfiguring, for a first time, the virtual network function to moderate a load of the virtual network function component in response to receiving the first notification. The method can also include receiving a second notification that the movement of the virtual network function component has been completed. The method can further include notifying the virtual network function operation and management component that the virtual network function component has been moved. The method can also include reconfiguring, for a second time, the virtual network function to readjust a load of the virtual network function component in response to receiving the second notification.

In an embodiment, the method may also include receiving a third notification that the virtual network function component should be moved from the first host to the second host. According to another embodiment, the method may further include requesting a virtualized infrastructure manager to wait for a specific amount of time before executing instructions for moving the virtual network function component.

In yet another embodiment, the method may include sending a status of a property of the virtual network function component to the virtualized infrastructure manager. Further, according to another embodiment, each notifying is performed via a Ve-Vnfm interface. Additionally, according to an embodiment, movement of the virtual network function component may be forbidden if the specific time is zero, and movement of the virtual network function component may be authorized if the specific time is greater than zero.

An apparatus, in certain embodiments, can include at least one processor, and at least one memory including computer program code. The at least one memory and the computer program code can be configured to, with the at least one processor, cause the apparatus at least to receive a first notification that a virtual network function component should be moved from a first host to a second host, notify a virtual network function operation and management component that the virtual network function component should be moved, reconfigure, for a first time, the virtual network function to moderate a load of the virtual network function component in response to receiving the first notification, receive a second notification that the movement of the virtual network function component has been completed, notify the virtual network function operation and management component that the virtual network function component has been moved, and reconfigure, for a second time, the virtual network function to readjust a load of the virtual network function component in response to receiving the second notification.

In an embodiment, the at least one memory and the computer program code may be configured to, with the at least one processor, cause the apparatus at least to receive a third notification that the virtual network function component should be moved from the first host to the second host. Further, according to another embodiment, the at least one memory and the computer program code may be configured to, with the at least one processor, cause the apparatus at least to request a virtualized infrastructure manager to wait for a specific amount of time before executing instructions for moving the virtual network function component.

In yet another embodiment, the at least one memory and the computer program code are configured to, with the at least one processor, cause the apparatus at least to send a status of a property of the virtual network function component to the virtualized infrastructure manager. Further, according to another embodiment, each notifying may be performed via a Ve-Vnfm interface. Additionally, according to an embodiment, movement of the virtual network function component may be forbidden if the specific time is zero, and movement of the virtual network function component may be authorized if the specific time is greater than zero.

An apparatus, according to certain embodiments, can include means for receiving a first notification that a virtual network function component should be moved from a first host to a second host. The apparatus can also include means for notifying a virtual network function operation and management component that the virtual network function component should be moved. The apparatus can further include means for reconfiguring, for a first time, the virtual network function to moderate a load of the virtual network function component in response to receiving the first notification. The apparatus can also include means for receiving a second notification that the movement of the virtual network function component has been completed. The apparatus can further include means for notifying the virtual network function operation and management component that the virtual network function component has been moved. The apparatus can also include means for reconfiguring, for a second time, the virtual network function to readjust a load of the virtual network function component in response to receiving the second notification.

In an embodiment, the apparatus may also include means for receiving a third notification that the virtual network function component should be moved from the first host to the second host. Further, according to another embodiment, the apparatus may further include means for requesting a virtualized infrastructure manager to wait for a specific amount of time before executing instructions for moving the virtual network function component.

In yet another embodiment, the apparatus may include means for sending a status of a property of the virtual network function component to the virtualized infrastructure manager. Further, according to another embodiment, each notifying may be performed via a Ve-Vnfm interface. Additionally, according to an embodiment, movement of the virtual network function component is forbidden if the specific time is zero, and wherein movement of the virtual network function component is authorized if the specific time is greater than zero.

According to certain embodiments, a non-transitory computer readable medium can be encoded with instructions that, when executed in hardware, perform a process, the process including at least deciding that a virtual network function component should be moved from a first host to a second host. The non-transitory computer readable medium can also be encoded with instructions that, when executed in hardware, perform a process, the process including at least notifying a virtual network function manager about moving the virtual network function component. The non-transitory computer readable medium can further be encoded with instructions that, when executed in hardware, perform a process, the process including at least moving the virtual network function component from the first host to the second host. The non-transitory computer readable medium can also be encoded with instructions that, when executed in hardware, perform a process, the process including at least notifying the virtual network function manager that the movement of the virtual network function component has been completed.

According to other embodiments, a non-transitory computer readable medium can be encoded with instructions that, when executed in hardware, perform a process, the process including at least receiving a first notification that a virtual network function component should be moved from a first host to a second host. The non-transitory computer readable medium can also be encoded with instructions that, when executed in hardware, perform a process, the process including at least notifying a virtual network function operation and management component that the virtual network function component should be moved. The non-transitory computer readable medium can further be encoded with instructions that, when executed in hardware, perform a process, the process including at least reconfiguring, for a first time, the virtual network function to moderate a load of the virtual network function component in response to receiving the first notification. The non-transitory computer readable medium can also be encoded with instructions that, when executed in hardware, perform a process, the process including at least receiving a second notification that the movement of the virtual network function component has been completed. The non-transitory computer readable medium can further be encoded with instructions that, when executed in hardware, perform a process, the process including at least notifying the virtual network function operation and management component that the virtual network function component has been moved. The non-transitory computer readable medium can also be encoded with instructions that, when executed in hardware, perform a process, the process including at least reconfiguring, for a second time, the virtual network function to readjust a load of the virtual network function component in response to receiving the second notification.

BRIEF DESCRIPTION OF THE DRAWINGS

For proper understanding of the invention, reference should be made to the accompanying drawings, wherein.

DETAILED DESCRIPTION

In case of VMs, it is possible to move the VM from one host computer to another without suspending the operation of the VM. This process is called live migration. During this operation, the performance of the VM might be affected, which can cause problems for the whole cluster. The VIM 180 may notify the VM directly about the live migration using a particular interface. However, a problem arises in that in the case of a clustered application, the VM may not be able take any actions to prepare itself for the live migration. This operation should be handled on the cluster level, but both the VM itself and even the VIM 180 are not aware of how the application cluster should be reconfigured. The VNF Manager 175 knows the needed interfaces and properties of the application to manage the reconfiguration. Thus, the VNF Manager 175 may be informed of the need for the live migration.

Certain embodiments may provide for improved methods for preparing the VM for live migration. As described above, the operation may be handled on the cluster level to reconfigure the application cluster by informing the VNF Manager 175 about the need for the live migration. This notification can become important each time the VM is live migrated. Live migration can be triggered by some automatic optimization process or by a manual interaction (e.g., maintenance). The effects of performance degradation of a single VM in a clustered VNF may not be known by the VIM 180. Certain embodiments may provide the possibility to prepare for the effects of the live migration in a controlled manner.

According to certain embodiments, VIM 180 may notify the VNF Manager 175 about the live migration. Upon receipt of the notification from VIM 180, the VNF Manager 175 may configure the VNF 105, 106, 107 for the operation, and acknowledge the operation. After the migration is finished, VIM 180 may notify the VNF Manager 175 so it can re-adjust the load of the migrated VM. Certain embodiments of the present invention may relate to interactions in the Vi-Vnfm and the Ve-Vnfm interfaces, and the functionality in VIM 180 and the VNF Manager 175.

Figure 1:
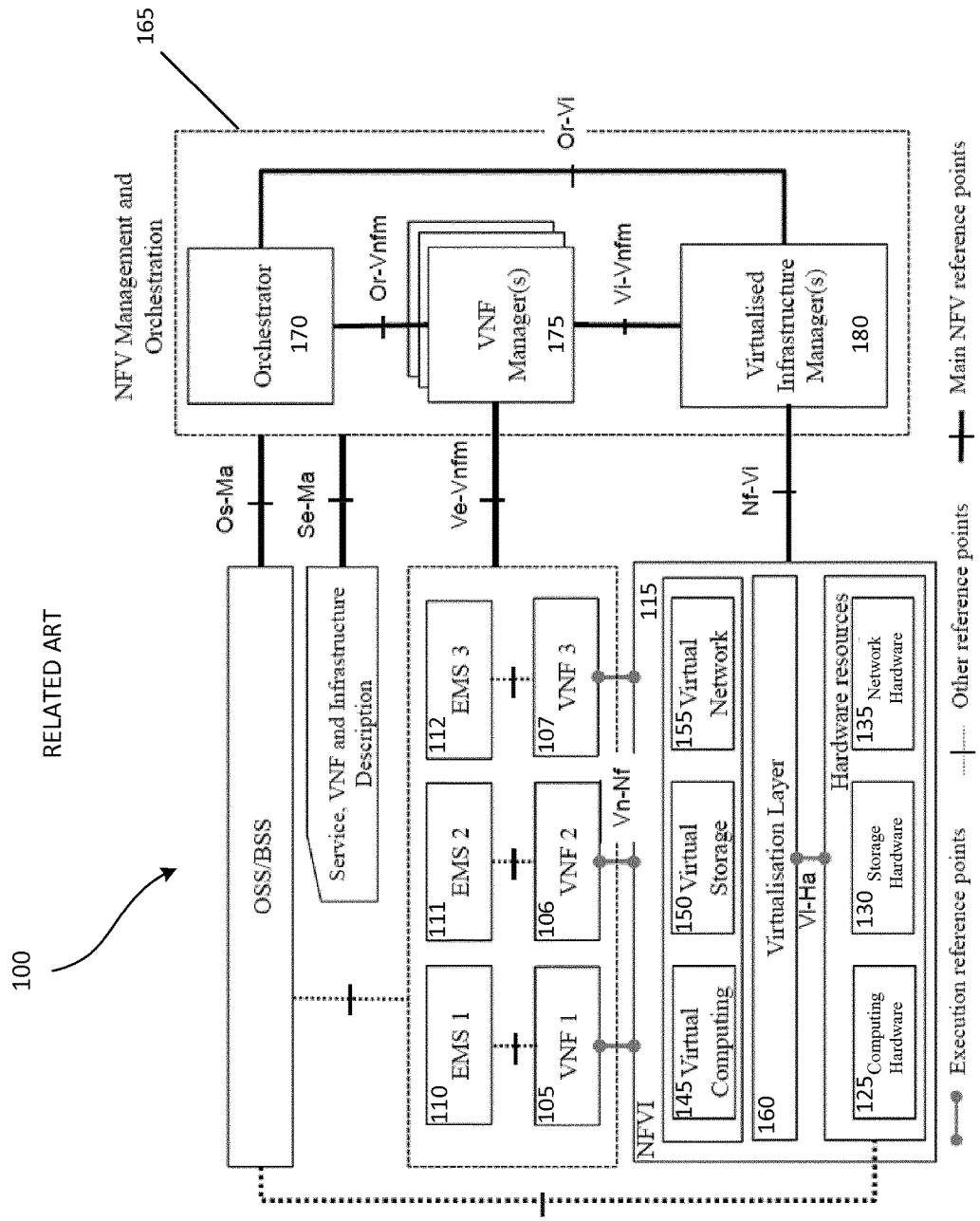
FIG. 1 illustrates a conventional NFV architectural framework.
Figure 2:
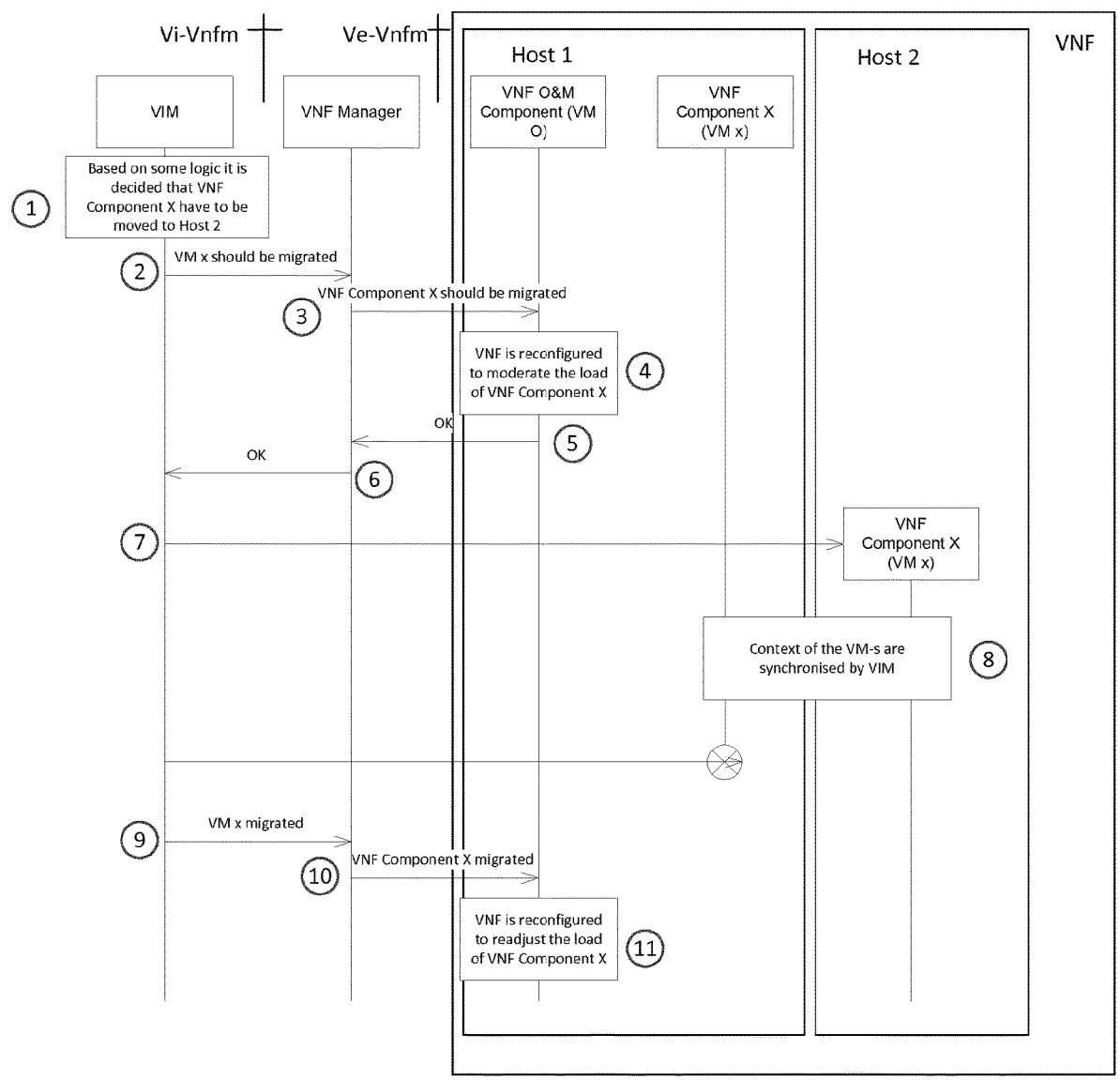
FIG. 2 illustrates a signaling flow according to certain embodiments.

FIG. 2 illustrates a signalling flow according to certain embodiments. In this solution alternative, the VIM's migration request is blocked until the reconfiguration is finished. At 1, VIM may decide that a particular VNF Component (VNFC), such as, for example, VNF Component X (VM x), should be migrated from one host to another. For instance, VM x may be migrated from Host 1 to Host 2. At 2, VIM may notify the VNF Manager that VM x should be migrated. At 3, in response to the notification from VIM, the VNF Manager may notify the VNF Operation and Maintenance (O&M) Component (VMO) that the VM x should be migrated. At 4, upon receipt of the notification from the VNF Manager, the VMO may reconfigure the VNF to moderate the load of the VM x. At 5, once reconfiguration is complete, the VMO may send an acknowledgment to the VNF Manager, which may in turn send an acknowledgment to VIM, at 6, confirming that VM x should be migrated. At 7, VIM may assist in the migration of the VM x from Host 1 to Host 2. At 8, the context of the VM-s may be synchronized by VIM with Host 1 and Host 2. Then, at 9, VIM may notify the VNF Manager that the migration of VM x from Host 1 to Host 2 has been complete. In response to this notification, the VNF Manager may, at 10, notify the VMO that the VM x has been migrated. Finally, at 11, the VMO may reconfigure the VNF to readjust the load of the VM x.

Figure 3:
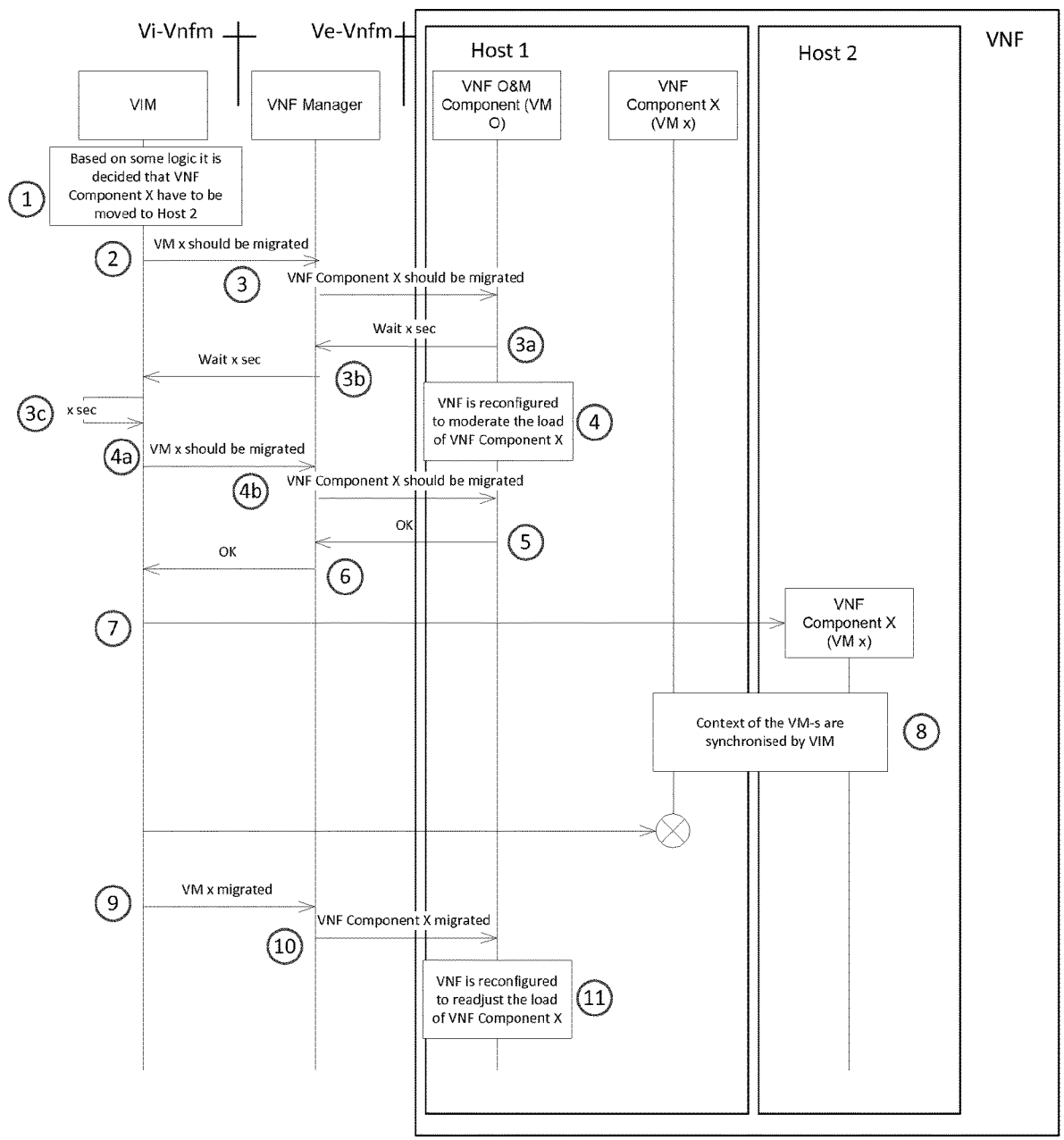
FIG. 3 illustrates another signaling flow according to certain embodiments.

FIG. 3 illustrates another signalling flow according to certain embodiments. In this implementation, there may be provided an asynchronous way for the VIM to wait until the reconfiguration is happening. The VIM's migration request is acknowledged immediately with an instruction. For example, once the reconfiguration of the VNF is happening, live migration of the VM x can begin.

At 1, VIM may decide that a particular VNF Component, such as, for example, VM x, should be migrated from one host to another. For instance, VM x may be migrated from Host 1 to Host 2. At 2, VIM may notify the VNF Manager that VM x should be migrated. At 3, in response to the notification from VIM, the VNF Manager may notify the VMO that the VM x should be migrated. At 3*a*, the VMO may instruct the VNF Manager to wait for a specific amount of time that may, for example, be set by the VMO. The amount of time may be designated as "x" amount of time, and may be expressed in seconds. At 3*b*, the VNF Manager may ask VIM to wait for "x" amount of time before executing the live migration of VM x when the cluster needs reconfiguration to moderate the load of the VM x. At 3*c*, in response to the VNF Manager's request, VIM waits for "x" seconds. However, if the value of "x" is zero, it is forbidden to migrate the VM x. At 4, during the wait time of "x", VMO may reconfigure the VNF to moderate the load of the VM x. At 4*a*, after "x" seconds has elapsed, VIM may execute the live migration of VM x by notifying the VNF Manager. At 4*b*, in response to VIM's instructions, the VNF Manager may indicate to the VMO that VM x should be migrated. At 5, once reconfiguration is complete, the VMO may send an acknowledgment to the VNF Manager, which may in turn send an acknowledgment to the VIM, at 6, confirming that VM x should be migrated. At 7, the VIM may assist in the migration of the VM x from Host 1 to Host 2. At 8, the context of the VM-s may be synchronized by VIM with Host 1 and Host 2. Then, at 9, VIM may notify the VNF Manager that the migration of VM x from Host 1 to Host 2 has been complete. In response to this notification, the VNF Manager may, at 10, notify the VMO that the VM x has been migrated. Finally, at 11, the VMO may reconfigure the VNF to readjust the load of the VM x.

Figure 4:
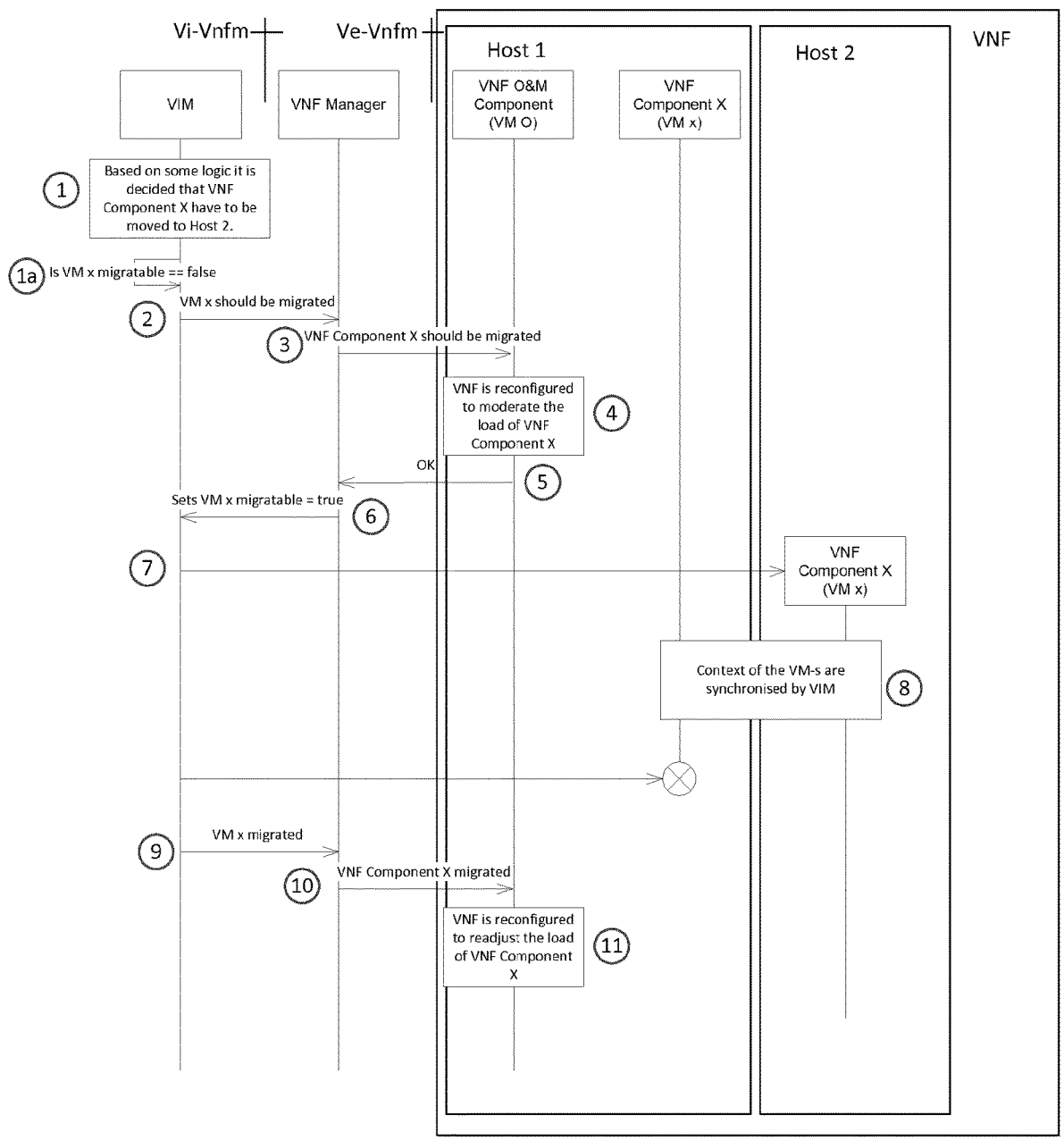
FIG. 4 illustrates yet another signaling flow according to certain embodiments.

FIG. 4 illustrates another signalling flow according to certain embodiments. In this implementation, all of the VM-s may have a property, migratable, which tells if it is allowed to live migrate the VM. If this property is false, VIM shall request the VNF Manager to modify this property. The VNF Manager may execute the necessary actions, such as, for example, reconfiguring VNF to reduce the load from the VM, and modify the migratable property of the VM. After this has been accomplished, VIM may execute the live migration and notify the VNF Manager when it is ready.

At 1 of FIG. 4, VIM may decide that a particular VNF Component, such as, for example, VM x, should be migrated from one host to another. For instance, VM x may be migrated from Host 1 to Host 2. At 1*a*, VIM may determine the status of a property of the VM x. As previously mentioned, this status may provide an indication as to whether live migration of the VM x is allowed. For example, if the status is "false", at 2, the VIM may notify the VNF Manager that VM x should be migrated, and asks the VNF Manager to modify this property. At 3, the VNF Manager may notify the VMO that the VM x should be migrated. At 4, upon receipt of the notification from the VNF Manager, VMO may reconfigure the VNF to moderate the load of the VM x. At 5, once reconfiguration is complete, the VMO may send an acknowledgment to the VNF Manager. At 6, the VNF Manager may set the status of the property of the VM x to be "true". At 7, upon receiving the "true" status of the property, VIM may assist in the migration of the VM x from Host 1 to Host 2. At 8, the context of the VM-s may be synchronized by VIM with Host 1 and Host 2. Then, at 9, VIM may notify the VNF Manager that the migration of VM x from Host 1 to Host 2 has been complete. In response to this notification, the VNF Manager may, at 10, notify the VMO that the VM x has been migrated. Finally, at 11, the VMO may reconfigure the VNF to readjust the load of the VM x.

Figure 5:
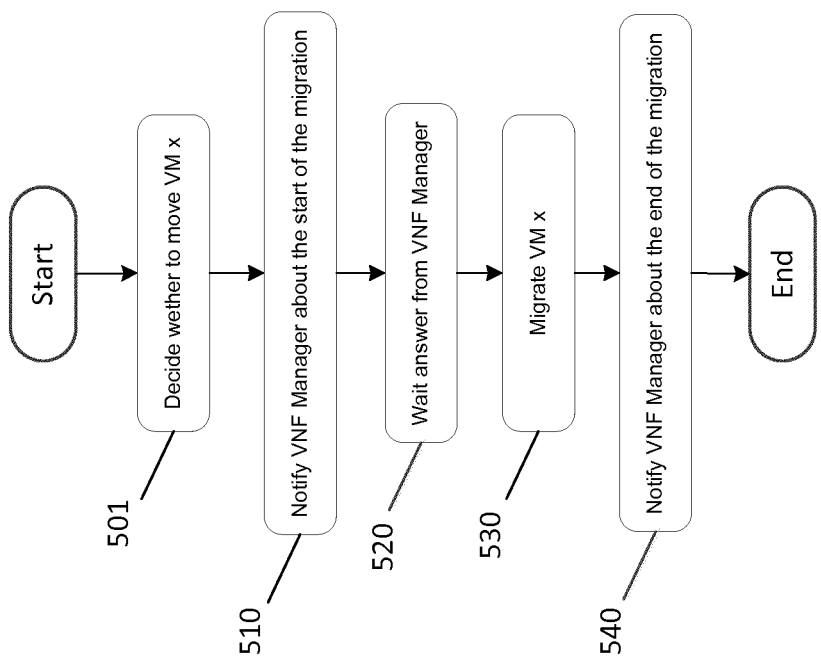
FIG. 5 illustrates an algorithm of a main success scenario in VIM according to certain embodiments shown in FIG. 3.

FIG. 5 illustrates a method according to certain embodiments. In particular, FIG. 5 illustrates an exemplary logic in the VIM according to the logic shown in FIG. 2. The method may include, at 501, deciding that a virtual network function component, for example VM x, should be moved from a first host to a second host. The method may also include, at 510, notifying the VNF Manager about the start of the migration of VM x. The method may further include, at 520, waiting for an answer from the VNF Manager. The method may also include, at 530, migrating the VM x from the first host to the second host. The method may also include, at 540, notifying the VNF Manager that the migration of VM x has been completed. According to certain embodiments, the notifying at 510 and 540 may be performed via a Vi-Vnfm interface.

Figure 6:
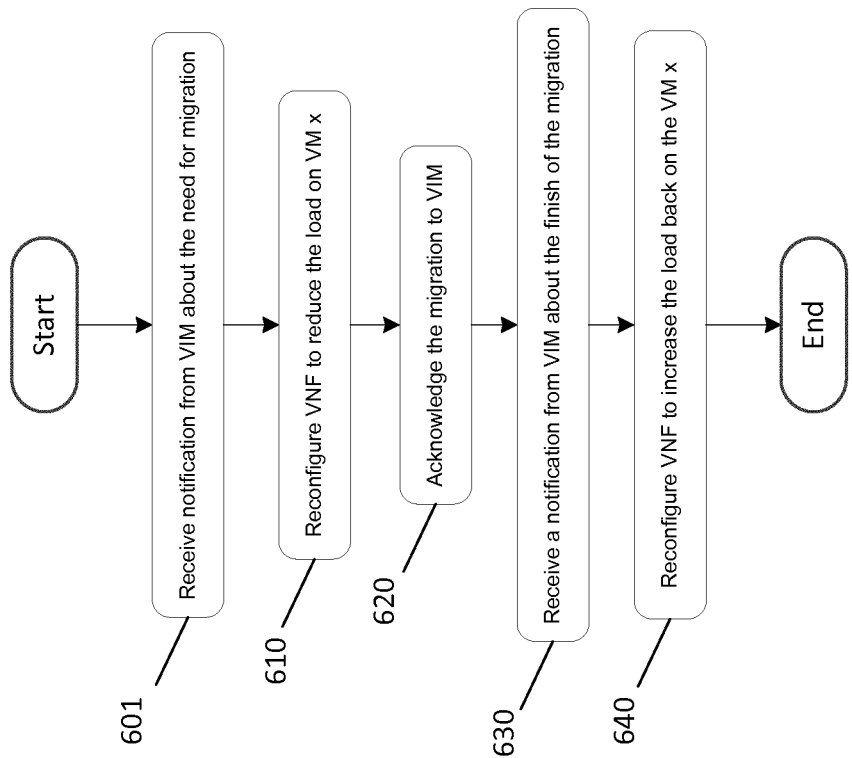
FIG. 6 illustrates an algorithm of a main success scenario in VNFM according to certain embodiments shown in FIG. 3.

FIG. 6 illustrates another method according to certain embodiments. In particular, FIG. 6 illustrates an exemplary logic in the VNF Manager according to the logic shown in FIG. 2. The method may include, at 601, receiving a notification from VIM about the need for migration of VM x. The method may also include, at 610, reconfiguring the VNF to moderate the load of VM x. For example, the reconfiguring may include reducing the load on VM x. The method may further include, at 620, acknowledging the migration to VIM. The method may also include, at 630, receiving a notification from VIM about the completion of the migration of VM x from the first host to the second host. The method may further include, at 640, reconfiguring the VNF to readjust the load of VM x. For example, reconfiguring the VNF may include increasing the load back on VM x.

Figure 7:
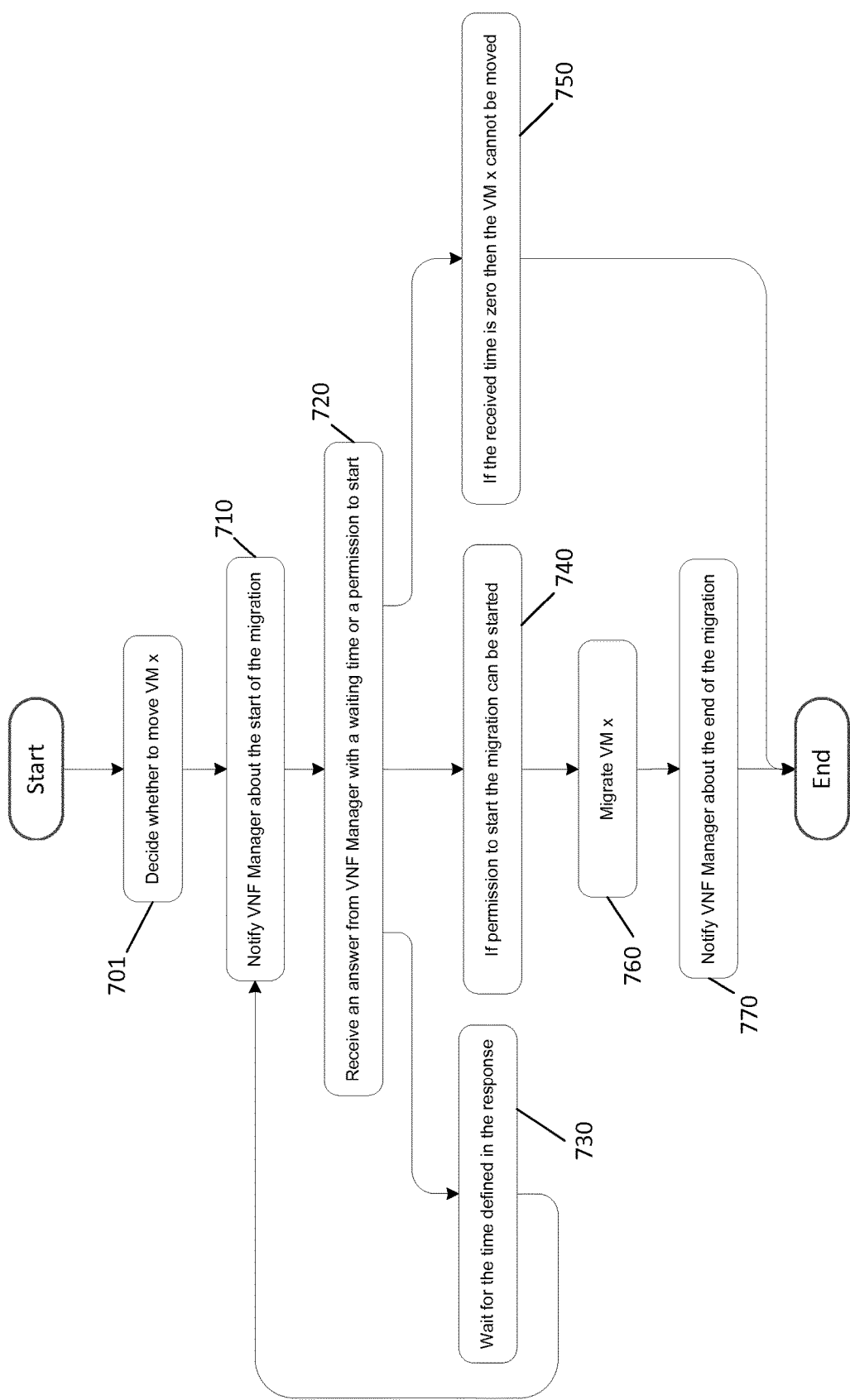
FIG. 7 illustrates an algorithm of VIM according to certain embodiments shown in FIG. 3.

FIG. 7 illustrates another method according to certain embodiments. In particular, FIG. 7 illustrates the logic in the VIM according to the logic shown in FIG. 3. The method may include, at 701, deciding whether a virtual network function component, for example VM x, should be moved from a first host to a second host. The method may also include, at 710, notifying the VNF Manager about the start of the migration of VM x. The method may further include, at 720, receiving an answer from the VNF Manager with a waiting time or a permission to start migration of VM x. According to certain embodiments, at this point, the method may proceed in three different ways. First, at 730, if a wait time is specified, then the method proceeds by waiting for the specific amount of time defined in the response from the VNF Manager. After waiting for the specific amount of time, the method may proceed back to 710, in which the VNF Manager is notified about the start of the migration. Alternatively if permission to start the migration is granted, at 740, the method may proceed to migrating VM x, at 760. However, at 750, if the wait time is zero, then VM x cannot be moved, and the method ends. After the VM x is migrated at 760, then, at 770, the VNF Manager may be notified about the completion of the migration. According to certain embodiments, the notifying at 710 and 770 may be performed via a Vi-Vnfm interface.

Figure 8:
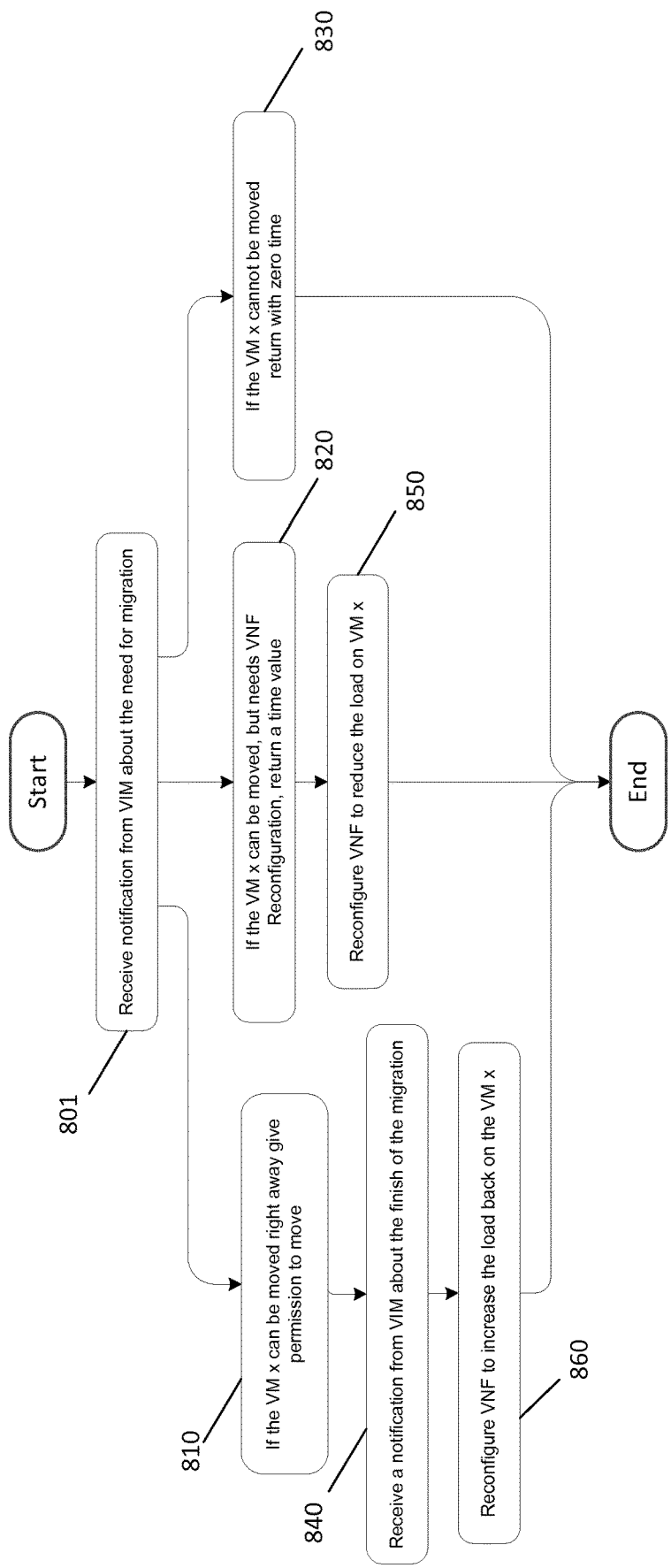
FIG. 8 illustrates an algorithm of VNFM according to certain embodiments shown in FIG. 3.

FIG. 8 illustrates another method according to certain embodiments. In particular, FIG. 8 illustrates the logic in the VNFM according to the logic shown in Figure 3. The method may include, at 801, receiving a notification from VIM about the need for migration of VM x from a first host to a second host. If it is determined that the VM x can be moved right away, then, at 810, permission to move VM x can be given. Once the VM x has been migrated, the VNF Manager may receive notification from VIM about the completion of the migration, at 840. Upon receiving this notification, the VNF may, at 860, be reconfigured to readjust the load of VM x. For example, the reconfiguration may include increasing the load back on the VM x. After reconfiguration, the method may be completed.

Alternatively, at 820, if it is determined that the VM x can be moved, but needs VNF reconfiguration, then a time value may be returned. According to certain embodiments, the time value may indicate a specific time for which VIM must wait before executing the migration. At 850, the time value has been met and the VNF may be reconfigured to moderate the load of VM x. For example, the reconfiguration may include reducing the load on VM x. After reconfiguration, the method may be completed.

Furthermore, if after receiving notification from VIM about the need for migration, at 801, it is determined that VM x cannot be moved, then, at 830, the VNF Manager returns a time value of zero, and the method is concluded.

Figure 9:
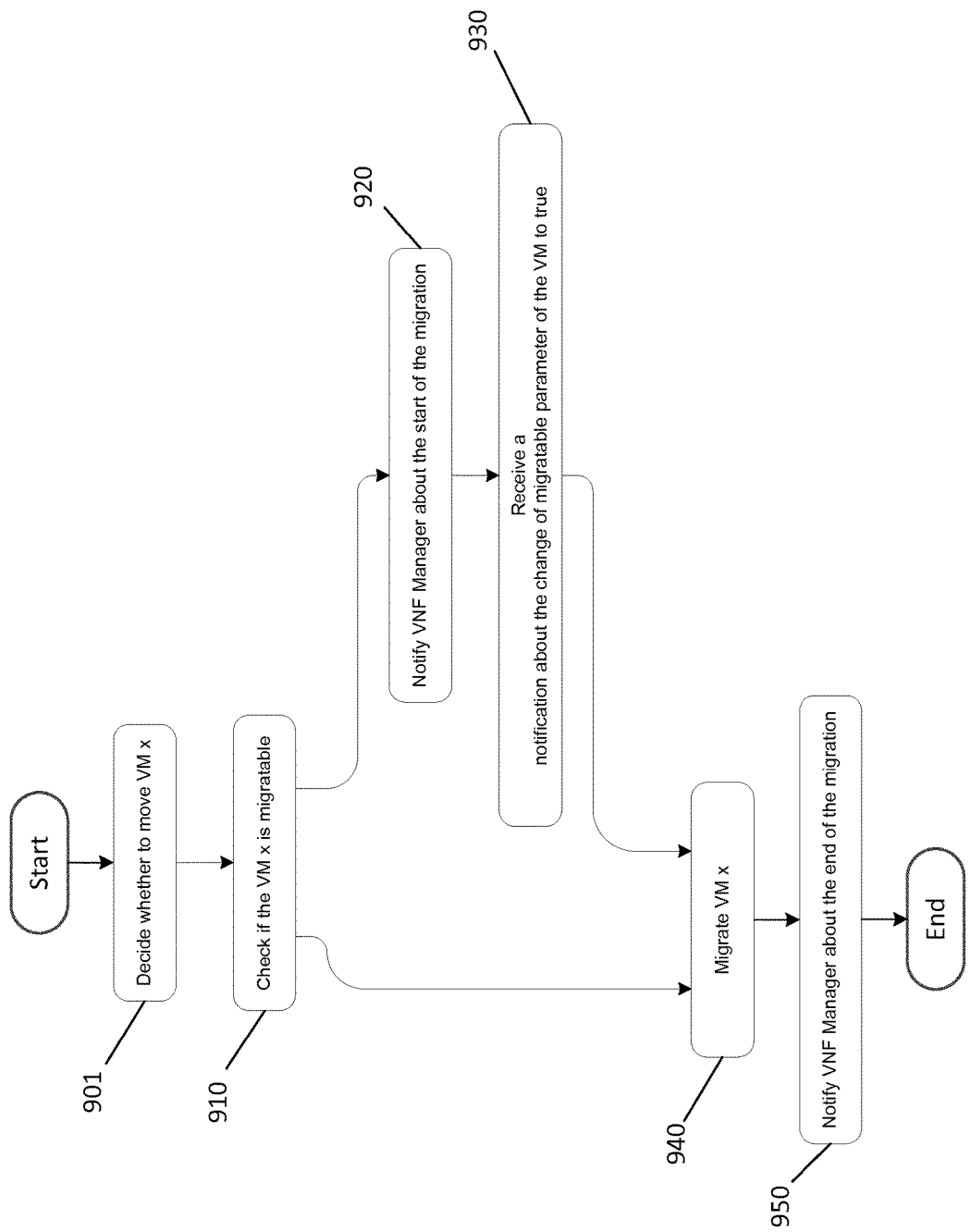
FIG. 9 illustrates an algorithm of VIM according to certain embodiments shown in FIG. 4.

FIG. 9 illustrates another method according to certain embodiments. In particular, FIG. 9 illustrates the logic in the VIM according to the sequence shown in FIG. 4. The method may include, at 901, deciding whether a virtual network function component, for example VM x, should be moved from a first host to a second host. The method may also include, at 910, checking if VM x is migratable. If it is determined that VM x is migratable, then the method may proceed to 940, in which VM x is migrated from the first host to the second host. After the migration of VM x is complete, at 950, the VNF Manager is notified about the completion of the migration.

Alternatively, after checking if VM x is migratable, VIM may notify the VNF Manager about the start of the migration, at 920. VIM may then, at 930, receive a notification from the VNF Manager about the change of a migratable parameter of VM x to "true". Upon receiving this notification, the method may proceed according to 940 and 950, as described above. Further, according to certain embodiments, the notifying at 920 and 950 may be performed via a Vi-Vnfm interface.

Figure 10:
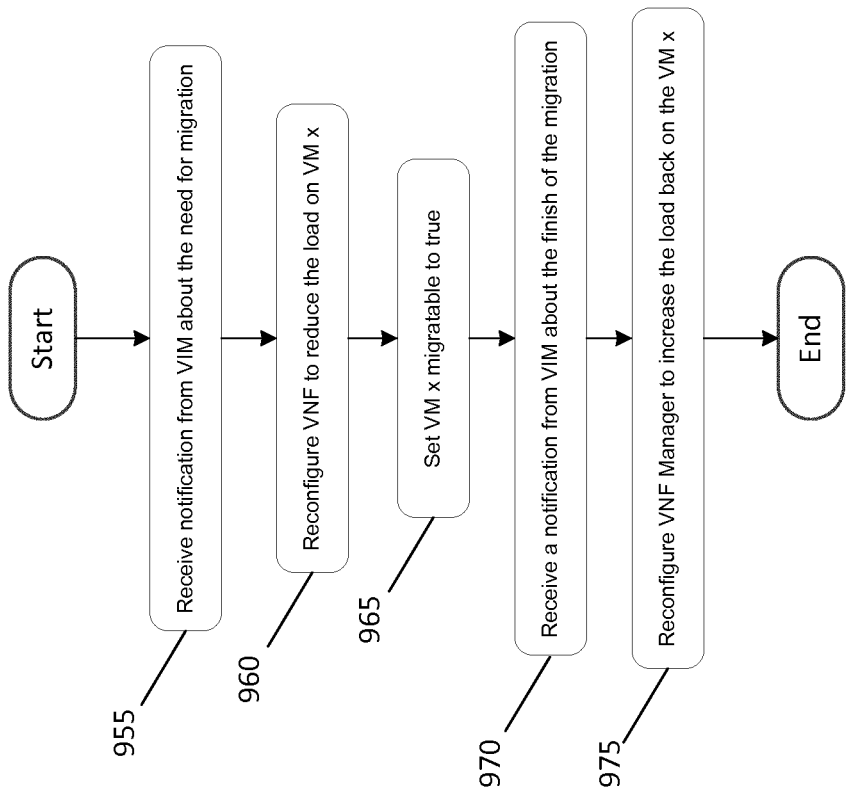
FIG. 10 illustrates an algorithm of VNFM according to certain embodiments shown in FIG. 4.

FIG. 10 illustrates another method according to certain embodiments. In particular, FIG. 10 illustrates the logic in the VNFM according to the sequence shown in FIG. 4. The method may include, at 955, receiving a notification from VIM about the need for migration of VM x from a first host to a second host. The method may also include, at 960, reconfiguring the VNF to moderate the load of VM x. For example, the reconfiguring may include reducing the load on VM x. The method may further include, at 965, setting the VM x migratable parameter to "true". The method may also include, at 970, receiving a notification from VIM about the completion of the migration of VM x from the first host to the second host. The method may further include, at 975, reconfiguring the VNF to readjust the load of VM x. For example, reconfiguring the VNF may include increasing the load back on VM x.

Figure 11:
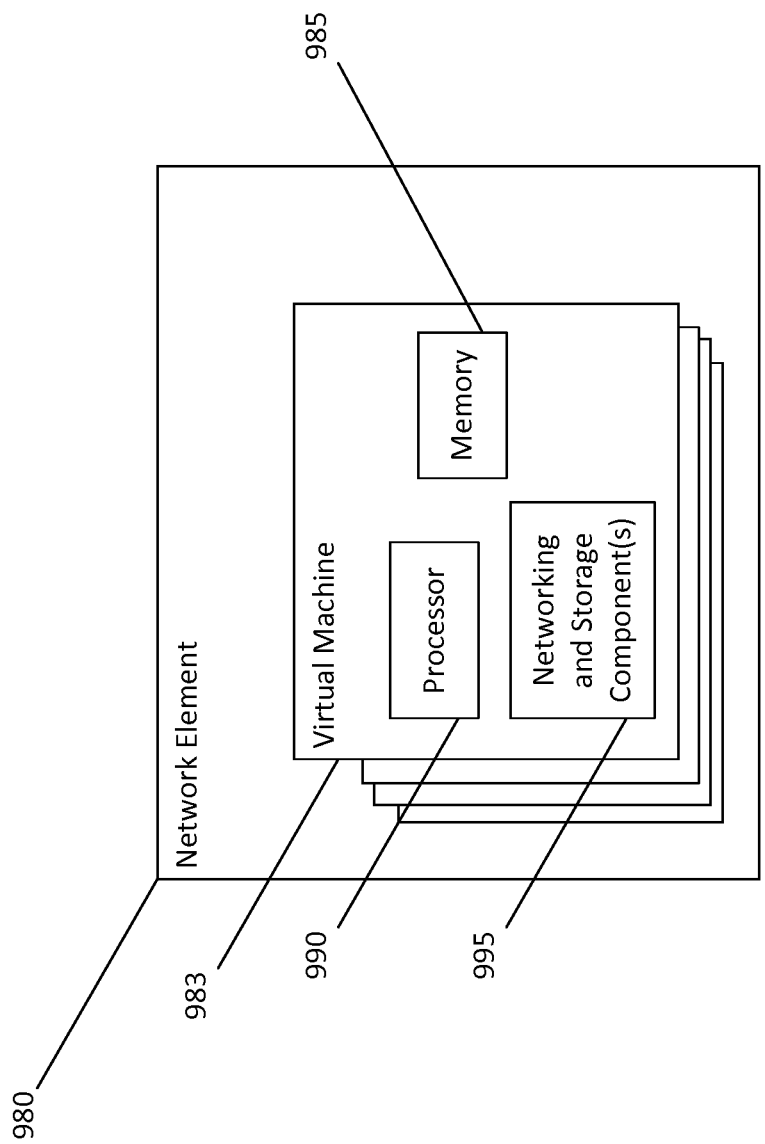
FIG. 11 illustrates a system according to certain embodiments.

FIG. 11 illustrates a system according to certain embodiments. In one embodiment, a system may include more than one network element 980. The network element 980 can be a control plane network element, for example a mobile switching center server (MSS), multi-media telephony application server (MMTEL AS), or any of the other network elements discussed herein, such as, for example, VIM 180, VNF Manager(s) 175, VNFs 105, 106 and 107, EMS 110, 111 and 112, Orchestrator 170, VMO, and/or VM x. In other embodiments, other network elements may be possible, such as an access point, base station, an eNode B, or other access network or core network elements.

The network element 980 may include at least one processor or control unit or module 990, and one or more virtual machines 983. At least one memory 985 may be provided in the network element 980. The memory 985 may include computer program instructions or computer code contained therein. Other configurations of the network element 980 may also be provided. The network element 980 may also include a networking and storage component(s) 995. Further, each of the one or more virtual machines may include one or more processors 990, on or more memory 985, and one or more networking and storage components 995. According to certain embodiments, the networking and storage component(s) 995 can include such components as a network interface card (NIC) or other communications hardware. The networking storage and component(s) 995 can also include local storage or access to remote storage capabilities.

Furthermore, although FIG. 11 illustrates a system including a network element 980, with a virtual machine 983, memory 985, processor 990, and networking and storage component(s) 995, embodiments of the invention may be applicable to other configurations, and configurations involving additional elements. For example, not shown, additional network elements may be present. Further, each additional network element may also include one or more virtual machines, and each virtual machine may include one or more processors, memory, and networking and storage components.

The operations and functionalities may be performed in different entities, such as node hosts or servers, in a flexible manner. In other words, division of labor may vary case by case. One possible use is to make a network element deliver local content. One or more functionalities may also be implemented as virtual application(s) in software that can run on a server.

Processor 990 may be a single or multiple core central processing unit (CPU). Memory 985 may be any suitable storage device, such as a non-transitory computer-readable medium. A hard disk drive (HDD), random access memory (RAM), flash memory, or other suitable memory may be used. Furthermore, the computer program instructions may be stored in the memory 985 and which may be processed by the processor 990 can be any suitable form of computer program code, for example, a compiled or interpreted computer program written in any suitable programming language. The memory or data storage entity is typically internal but may also be external or a combination thereof, such as in the case when additional memory capacity is obtained from a service provider.

The memory and the computer program instructions may be configured, with the processor for the particular device, to cause a hardware apparatus such as network element 980, to perform any of the processes described above (see, for example, FIGS. 2-10). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

PARTIAL GLOSSARY

EMS Element Management System
NF Network Function
NFV Network Function Virtualization
O&M Operation and Maintenance
VIM Virtualized Infrastructure Manager
VM Virtual Machine
VNF Virtual Network Function

We claim:

1. A method, comprising:
deciding, by a virtualized infrastructure manager, that a virtual network function component should be moved from a first host to a second host;
notifying, by the virtualized infrastructure manager, a virtual network function manager about moving the virtual network function component;
waiting, by the virtualized infrastructure manager, for a specific amount of time to elapse, as requested by the virtual network function manager, before moving the virtual network function component, wherein the specific amount of time originates from the first host;
moving, by the virtualized infrastructure manager, the virtual network function component from the first host to the second host only when approval is received from the virtual network function manager, and after the specific amount of time has elapsed; and
notifying, by the virtualized infrastructure manager, the virtual network function manager that the movement of the virtual network function component has been completed.

2. The method of claim 1, wherein the notifying is performed via a virtualization layer-virtual network function manager interface.

3. The method of claim 1, further comprising determining a status of a property of the virtual network function component.

4. The method of claim 1, wherein movement of the virtual network function component is forbidden if a specific time is zero, and wherein movement of the virtual network function component is authorized if the specific time is greater than zero.

5. A virtualized infrastructure manager, comprising:
at least one processor; and
at least one memory including computer program code,
wherein the at least one memory and the computer program code are configured to, with the at least one processor, cause the virtualized infrastructure manager at least to
decide that a virtual network function component should be moved from a first host to a second host,
notify a virtual network function manager about moving the virtual network function component,
wait for a specific amount of time to elapse, as requested by the virtual network function manager, before moving the virtual network function component, wherein the specific amount of time originates from the first host,
move the virtual network function component from the first host to the second host only when approval is received from the virtual network function manager, and after the specific amount of time has elapsed, and
notify the virtual network function manager that the movement of the virtual network function component has been completed.

6. The apparatus of claim 5, wherein the notifying is performed via a virtualization layer-virtual network function manager interface.

7. The apparatus of claim 5, wherein the at least one memory and the computer program code are configured to, with the at least one processor, cause the apparatus at least to determine a status of a property of the virtual network function component.

8. The apparatus of claim 5, wherein movement of the virtual network function component is forbidden if a specific time is zero, and wherein movement of the virtual network function component is authorized if the specific time is greater than zero.

9. An apparatus, comprising:
means for receiving a first notification that a virtual network function component should be moved from a first host to a second host;
means for notifying a virtual network function operation and management component that the virtual network function component should be moved;
means for reconfiguring, for a first time, a virtual network function to moderate a load of the virtual network function component in response to receiving the first notification;
means for receiving a second notification that the movement of the virtual network function component has been completed;
means for notifying the virtual network function operation and management component that the virtual network function component has been moved;
means for reconfiguring, for a second time, the virtual network function to readjust a load of the virtual network function component in response to receiving the second notification;
means for receiving a specific amount of time from the first host;
means for generating a request to be received by a virtualized infrastructure manager to wait for the specific amount of time before the virtualized infrastructure manager executes instructions for moving the virtual network function component; and
means for receiving, after the specific amount of time has elapsed, a third notification indicating that movement of the virtual network function component should commence, wherein the third notification is received in addition to the first notification.

10. The apparatus of claim 9, wherein the third notification further indicates that the virtual network function component should be moved from the first host to the second host.

11. The apparatus of claim 9, further comprising means for sending a status of a property of the virtual network function component to the virtualized infrastructure manager.

12. The apparatus of claim 9, wherein each notifying is performed via a virtualization environment-virtual network function manager interface.

13. The apparatus of claim 9, wherein movement of the virtual network function component is forbidden if a specific time is zero, and wherein movement of the virtual network function component is authorized if the specific time is greater than zero.

14. A non-transitory computer readable medium having instructions, when executed by a processor, is configured to perform the method recited in claim 1.

\* \* \* \* \*